Sept. 15, 1936.  A. W. BROWNE  2,054,691

HYDROMETER FOR ELECTRICAL ACCUMULATORS

Filed July 14, 1934

WITNESS:

INVENTOR

Arthur W. Browne
BY
Augustus B. Stoughton.
ATTORNEY.

Patented Sept. 15, 1936

2,054,691

UNITED STATES PATENT OFFICE 2,054,691

HYDROMETER FOR ELECTRICAL ACCUMULATORS

Arthur William Browne, Clifton Junction, near Manchester, England, assignor to The Electric Storage Battery Company, Philadelphia, Pa., a corporation of New Jersey Application July 14, 1934, Serial No. 735,109 In Great Britain July 20, 1933

5 Claims. (Cl. 265—45)

My invention relates to hydrometers for electric accumulators of the type comprising a pointer immersed in the electrolyte in the cell mounted to turn about a fixed centre and counter-balanced so that it moves about its fulcrum in accordance with the density of the electrolyte and thus indicates the condition of charge or discharge of the accumulator.

The object of the present invention is to provide an improved form of hydrometer and an improved arrangement of the same in the accumulator in order that the indications given by the pointer shall be clear and reliable and that the pointer shall be very steady and subject to a minimum of interference by external factors.

The invention comprises the improved hydrometer as hereinafter described and claimed.

Referring to the accompanying sheet of explanatory drawing.

Figures 1, 2, 3:
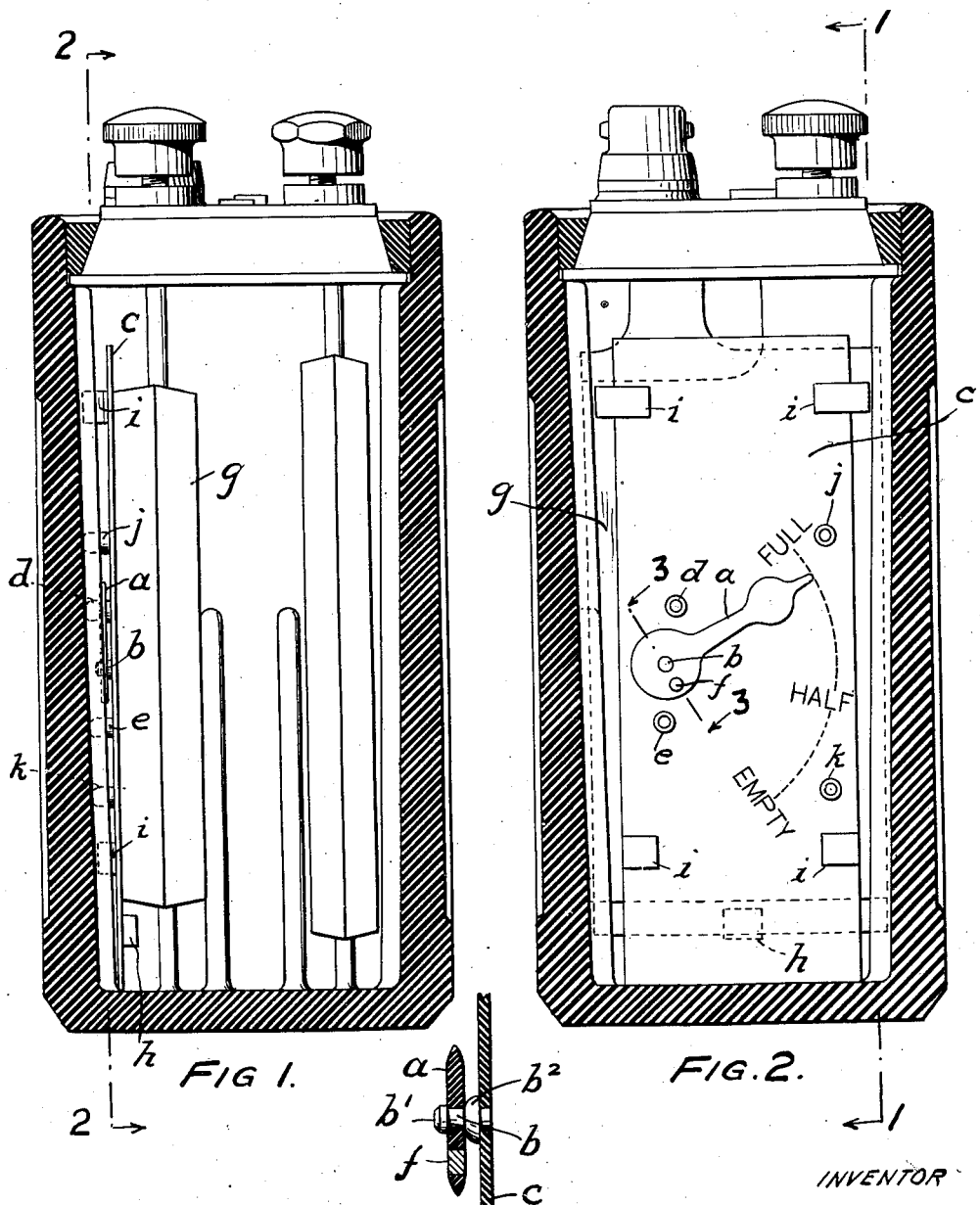
Figure 1 is a sectional side elevation on the line 1—1 of Figure 2 of an accumulator with my improved hydrometer located therein.
Figure 2 is a sectional front elevation on the line 2—2 of Figure 1.
Figure 3 is a detail sectional view on the line 3—3 of Figure 2.

The pointer $a$ is made of ebonite or other suitable material of a specific gravity approximately half way between the maximum and minimum specific gravities to be indicated. It is unaffected by the electrolyte. The pointer $a$ has a knife-like edge as shown in Figure 3 to minimize the tendency of the gas bubbles to adhere thereto in service and so effect the accuracy of the readings. The complete indicator is also preferably treated with a degreasing agent to minimize the tendency of gas bubbles to adhere thereto.

The pointer is carried by a celluloid pivot pin $b$ upon a celluloid or like sheet $c$ upon which are the markings indicating the condition of charge or discharge of the accumulator, also stops $d$, $e$ for limiting the pivotal movements of the pointer. The latter is made of considerable relative mass or weight towards its indicating end in order to permit the use of a maximum size of counter balance weight $f$, which is inserted in a hole in the pointer, thereby ensuring that the pointer shall give a stable reading and shall not be subject to movement by small disturbing forces, such as gas bubbles or the like. The counter-weight is made of lead which is inert to sulphuric acid and has the necessary high specific gravity. The weight $f$ is positioned below the pivot when the pointer is in a horizontal position. This disposition in conjunction with the specific gravity of the ebonite of the pointer provides a uniform scale above and below the horizontal position over the specific gravity range of the electrolyte of the cell. I arrange the weight value of the counter-weight so that the pointer moves approximately 45° above and 45° below the horizontal position. This enables the scale of readings to be of an open character.

The pivot pin $b$ upon which the pointer turns, is formed with an enlarged head $b^1$ so that the pointer is pressed thereover and is retained thereby upon the pin (see Figure 3). The diameter of the pin is reduced behind the head to allow the pointer to turn freely thereon in service. The collar-like enlargement $b^2$ behind the pointer may be rounded at the side against the pointer to reduce friction (see Figure 3).

The celluloid or like sheet $c$ upon which the pointer $a$ is pivotally mounted, lies against the face of a plate $g$ within the accumulator and rests on the bottom of the case and has a peg or lug $h$ upon the rear lower part thereof which comes below the plate $g$ and prevents the indicator moving too far upwardly in the cell if the latter be inverted. Suitable spacing lugs $i$ upon the face of the celluloid maintain the latter at the desired distance from the accumulator case (which is made of glass or transparent celluloid) and against the plate $g$, to allow of the free movements of the pointer. The stops $d$, $e$ and similar pegs $j$, $k$, also form abutments and spacing members to prevent buckling of the sheet over the area in which the scale is located so that the pointer is never obstructed in its movements.

It will be understood that the ebonite pointer with its lead counter-balance weight acts in the known manner on a change in the density of the electrolyte, due to the centre of mass of the pointer being non-coincident with its centre of volume.

I do not intend to be limited save as the scope of the prior art and of the attached claims may require.

I claim:—

1. A hydrometer for an electric accumulator comprising a celluloid or like sheet having lugs thereon to space it from the cell wall and to hold it against a plate in the cell, with a further lug or lugs to hold the sheet against movement in the cell, a pointer of ebonite (of considerable relative mass towards its indicating end) pivotally mounted on the sheet and counter-balanced with lead let into the pointer so that the centre of mass of the pointer is non-coincidental with the centre of volume thereof, stops limiting the movement of the pointer and serving in conjunction with said lugs upon the sheet to prevent warping of the latter at the scale over which the pointer moves in indicating the range of specific gravity variations of the electrolyte.

2. In a hydrometer as claimed in claim 1, the pointer being formed with a knife edge to minimize the tendency of gas bubbles to adhere thereto.

3. A hydrometer for an electric accumulator comprising, a support, a pointer pivotally mounted on said support and whose centre of gravity does not coincide with whose centre of mass, indicia on said support co-operating with said pointer, and stops on said support co-operating with said pointer and preventing complete rotation thereof and also serving to space said support from the case of the accumulator.

4. A hydrometer for an electric accumulator comprising, a support, a pointer pivotally mounted on said support, a weight attached to said pointer adjacent the pivot, indicia on said support co-operating with said pointer, and stops on said support cooperating with said pointer and preventing complete rotation thereof and also serving to space said support from the case of the accumulator.

5. A hydrometer for an electric accumulator comprising, a flat plate adapted for insertion between the container and the plates of the accumulator, said flat plate being independent of said container and said plates, a pointer pivotally mounted on said flat plate and whose centre of gravity does not coincide with the point at which said pointer is pivoted, indicia on said flat plate co-operating with said pointer, and stops on said flat plate co-operating with said pointer to prevent complete rotation thereof and also serving to space said flat plate from said container.

ARTHUR WILLIAM BROWNE.